United States Patent [19]

Bourke

[11] 4,350,552
[45] * Sep. 21, 1982

[54] METHOD AND APPARATUS FOR CUTTING STONE PANELS

[76] Inventor: Patrick T. Bourke, Doon House, Maam, County Galway, Ireland

[*] Notice: The portion of the term of this patent subsequent to Dec. 20, 1994, has been disclaimed.

[21] Appl. No.: 147,757

[22] Filed: May 8, 1980

Related U.S. Application Data

[60] Continuation-in-part of Ser. No. 64,999, Aug. 7, 1979, which is a division of Ser. No. 848,352, Nov. 3, 1977, abandoned, which is a continuation-in-part of Ser. No. 868,213, May 12, 1976, Pat. No. 4,063,982, which is a continuation-in-part of Ser. No. 394,138, Sep. 4, 1973, Pat. No. 3,963,846.

[30] Foreign Application Priority Data

Sep. 4, 1972 [GB] United Kingdom ............... 40839/72
Jan. 19, 1973 [GB] United Kingdom ................. 2795/73

[51] Int. Cl.$^3$ ............................................. B32B 31/00
[52] U.S. Cl. ........................................ 156/254; 83/36; 83/51; 125/12; 125/13 R
[58] Field of Search ................. 156/254, 268, 99, 101, 156/107; 125/12, 13 R; 83/35, 36, 51; 271/102, 103; 414/752, 753, 758, 759; 269/21, 24, 57

[56] References Cited

U.S. PATENT DOCUMENTS

3,384,468 5/1968 Dean .................................. 156/107
4,063,982 12/1977 Bourke ............................... 156/254
4,131,103 12/1978 Ishizuba ................................ 83/36

FOREIGN PATENT DOCUMENTS

2129057 12/1972 Fed. Rep. of Germany .
2655375  6/1978 Fed. Rep. of Germany .... 125/13 R
1524272  4/1968 France .
2190051  1/1974 France .
 570250 10/1975 Switzerland .

Primary Examiner—Caleb Weston
Attorney, Agent, or Firm—Young & Thompson

[57] ABSTRACT

The invention relates to a method of cutting thin laminae of stone, e.g. marble, which comprises bonding a backing layer to the opposed faces of a slab of stone, supporting the slab with backing layers attached, in an upward position on its edge, cutting the slab along a cutting plane parallel to and midway between the opposed faces of the slab to a depth which is about half the depth of the slab, tumbling the slab on to its opposite longitudinal edge, and cutting through the remainder of the depth of the slab to leave a lamina of stone adhered to each backing layer. The invention also includes apparatus for carrying out the aforesaid method, comprising a saw having two disc blades, a bogie movable beneath the saw and having a pair of vacuum-operated slab-gripping devices each of which is adapted to support a slab upwardly on its edge, and a second bogie movable in a direction transverse to the first bogie and carrying means for tumbling a slab supported on one longitudinal edge, through 180°, so that it rests on its opposite longitudinal edge.

3 Claims, 9 Drawing Figures

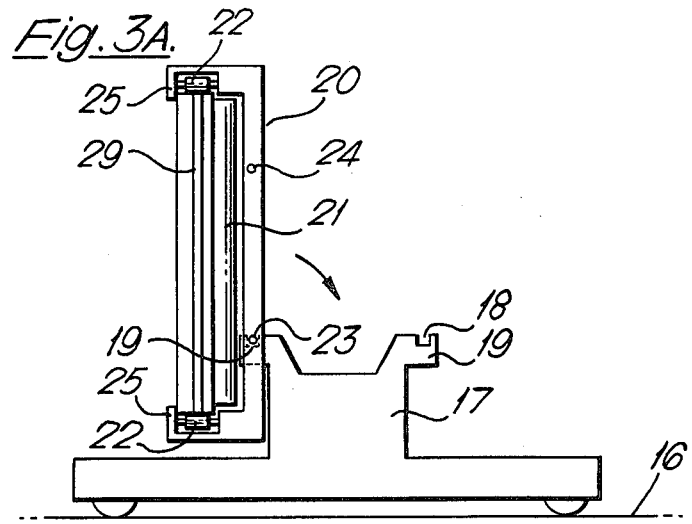
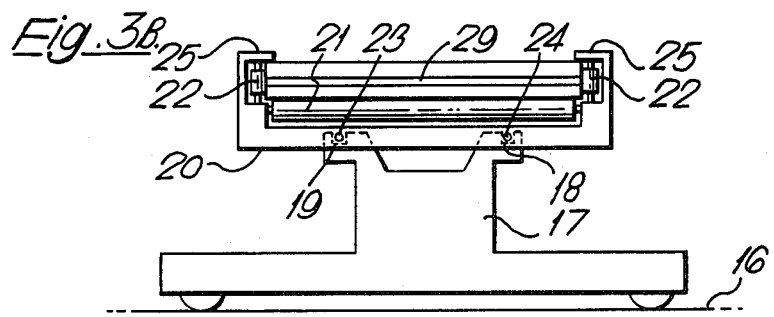
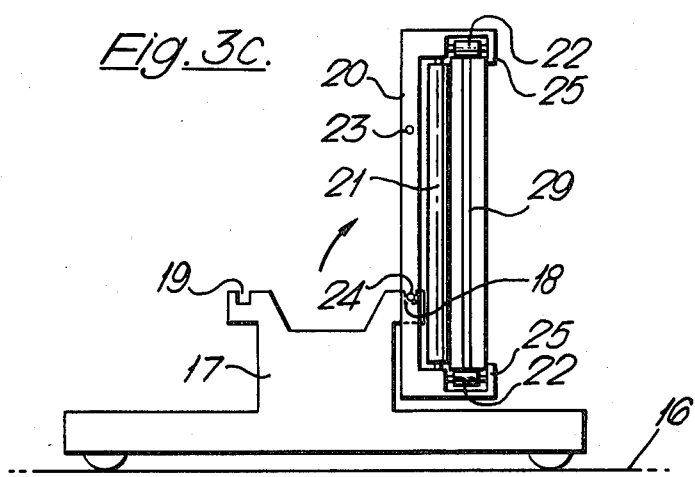

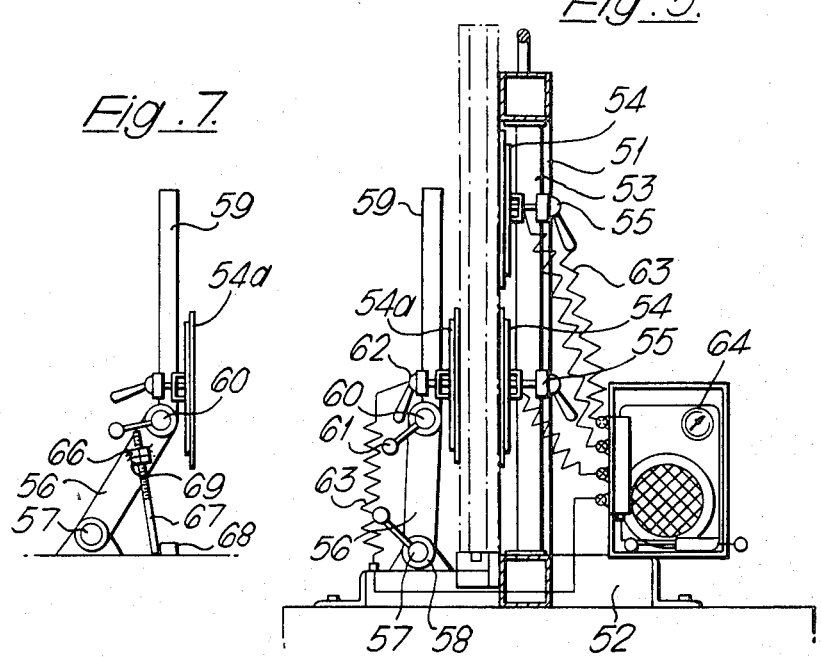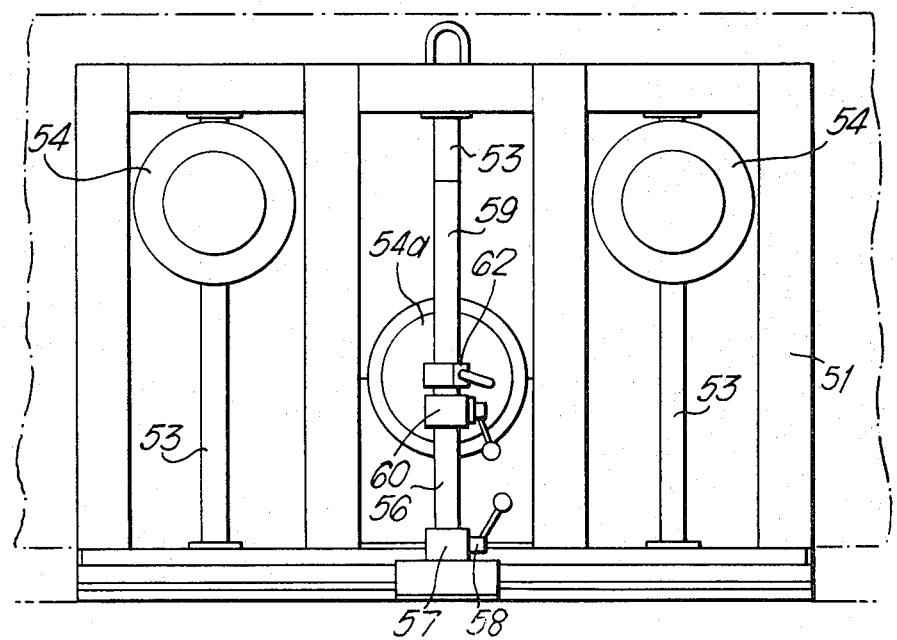

METHOD AND APPARATUS FOR CUTTING STONE PANELS

This application is a continuation-in-part of my co-pending application Ser. No. 64,999, filed Aug. 7, 1979, which in turn is a division of my application Ser. No. 848,352, filed Nov. 3, 1977, abandoned, which in turn was a continuation-in-part of May application Ser. No. 868,213, filed May 12, 1976 and now U.S. Pat. No. 4,063,982, which in turn was a continuation-in-part of my application Ser. No. 394,138, filed Sept. 4, 1973 and now U.S. Pat. No. 3,963,846.

This invention concerns a method and apparatus for the construction of composite surface elements, such as tiles and panels, having a natural stone facing. Such elements are intended for use, for example, in the cladding of walls, ceilings or other surface, in the manufacture of furniture, and for all purposes where natural stone surfaces are required.

Natural stone, such as marble, is an exquisite surfacing material on account of its hardness and durability, its beauty of structure and the high polish which can usually be imparted to it, but its use is greatly restricted by reason of its weight and expense, since the material is liable to fracture is not of a certain thickness, depending upon the handling and usage to which it may require to be subjected. These drawbacks are overcome by the invention the subject of my U.S. Pat. No. 3,723,233 which describes a method of preparing a stone-faced composite surface element having a lamina of stone bonded to a backing sheet, comprising adhesively bonding to the surface of a stone slab a backing sheet of light-weight multicellular material of substantially greater thickness than said lamina, and thereafter sawing off a portion of said slab to leave a thin marble lamina adhered to said sheet of multicellular material. As the backing sheet supports the lamina when it is being cut, the risk of cracking the lamina is reduced and remarkably thin stone laminae of the order of between 2 and 5 mm in thickness, may be obtained. In carrying out the aforesaid method a large block of stone is first cut into a number of slabs which are of the order of 20 to 25 mm in thickness. The slabs are dried and a light-weight backing sheet is bonded to each of the two opposite faces of the slab. The slab is then sawn in two along a cutting plane substantially parallel to and midway between said faces to leave a thin lamina of stone attached to each backing sheet. In my U.S. Pat. No. 4,063,982 I have described a method and apparatus for rigidly supporting the slab during the sawing operation without exerting inwardly directed pressure on the partly-cut stone layers or on the saw. This method comprises the steps of:

(i) cutting a block of natural facing stone into a number of slabs, two opposite faces of which are substantially parallel and each of which has a thickness greater than twice the thickness of the desired lamina;

(ii) applying and bonding to each of the two opposed faces of each stone slab a backing sheet comprising a core of light-weight sheet material which is resistant to compressive forces in a direction substantially normal to the plane of the sheet;

(iii) positioning each slab, with the backing sheets attached to the opposite faces thereof, between oppositely arranged vacuum-operated suction cups;

(iv) applying suction to the cups to hold the slab rigidly in position therebetween;

(v) sawing the slab in two along a cutting plane substantially parallel to and midway between said faces to leave a thin stone lamina adhered to each said backing sheet, and during the sawing steps maintaining the suction to inhibit relative movement of the partly-cut stone layers.

The apparatus for rigidly supporting the slab during the sawing operation comprises first gripping means in the form of at least one first vacuum-operated suction cup, second gripping means in the form of at least a second vacuum-operated suction cup disposed in opposed spaced relation to said first suction cup, such that a stone slab may be positioned between said suction cups, means for applying suction to each of the cups such that said first cup is adapted to grip one face of the slab while the second suction cup is adapted to grip the opposite face of the slab. When cutting the marble laminae it is advantageous to use a saw having a disc blade rather than a band saw. The disadvantage of the disc blade saw is that the diameter of the blade must be kept small as otherwise the unsupported peripheral edge of the blade vibrates during cutting which tends to leave wavy patterns on the cut surface of the stone. Nevertheless, I have found that by using the vacuum gripping device referred to above, I can obtain considerable accuracy in cutting even when using a relatively large blade e.g. of a diameter of the order of 2.5 m. However, even with a blade of this diameter the width of the stone panel produced is limited to about 1.0 m (i.e. to less than the radius of the saw blade). Furthermore, a disc blade having a diameter of 2.5 m is relatively thick and so due to the width of the kerf it is necessary to start with a stone slab of a thickness of 23 mm instead of the standard sawn slab of a thickness of 20 mm which is readily available. Further, there is a consumer demand for stone-faced panels of a size of 2.0 m × 1.25 m.

It is thus an object of the invention to provide a method and apparatus whereby stone panels can be cut accurately to a width of up to 1.25 m using a disc saw and with a minimum of kerf.

According to the present invention a method of manufacturing composite surface elements having a lamina of stone bonded to a backing layer comprises the steps of:

(i) applying and bonding to each of the two opposed faces of a stone slab a backing layer comprising a core of light-weight material which is resistant to compressive forces in a direction substantially normal to the plane of the layer;

(ii) gripping the slab, with backing layers attached, by means of a slab-gripping device;

(iii) presenting one longitudinal edge of the slab to a disc saw and sawing the slab along a cutting plane substantially parallel to and midway between the aforesaid opposed faces of the slab to a depth which is approximately half the depth of the slab; and (iv) presenting the opposite longitudinal edge of the slab to a disc saw, gripping the slab as in step (ii), and sawing along the same cutting plane as in step (iii) through the remainder of the depth of the slab thereby sawing the slab in two to leave a thin stone lamina adhered to each of the backing layers.

In a preferred embodiment, the slab in step (ii) is stood on its longitudinal edge and between opposite positioned vacuum-operated suction cups and suction is applied to the cups to hold the slab rigidly in position therebetween; the suction being maintained during the sawing steps so as to inhibit relative movement of the partly-cut stone layers. Preferably, after the first cut is made in the slab in step (iii) the slab is tumbled through 180° to present the opposite longitudinal edge of the slab to the saw.

The invention includes apparatus for carrying out the method described above, comprising a saw having at least one disc blade adapted to cut in a vertical plane, a bogie for conveying a stone slab beneath the saw blade, at least one vacuum-gripping device mounted on said bogie and adapted to rigidly hold the slab upwardly on its longitudinal edge, and means for tumbling the partly-cut slab on to its opposite longitudinal edge after the first pass through the saw.

In a preferred embodiment the saw includes two spaced-apart parallel saw blades and the bogie has mounted thereon on a pair of vacuum-gripping devices each of which comprises a first gripping means in the form of at least one first vacuum-operated suction cup, second gripping means in the form of at least a second vacuum-operated suction cup disposed in opposed spaced relation to said first suction cup, such that a stone slab may be positioned between said suction cups, means for applying suction to each of the cups such that said first cup is adapted to grip one face of the slab while the second suction cup is adapted to grip the opposite face of the slab.

One embodiment of apparatus for use in carrying out the method of the invention is illustrated in the accompanying drawings, wherein:

FIGS. 3a, 3b and 3c are elevations of a tumbling device in the direction of the arrow B of FIG. 1;

FIG. 5 is a side elevation of a vacuum-gripping device;

FIG. 6 is a front elevation of the device of FIG. 5; and

FIG. 7 is a modification of the device of FIG. 1.

Figure 1:
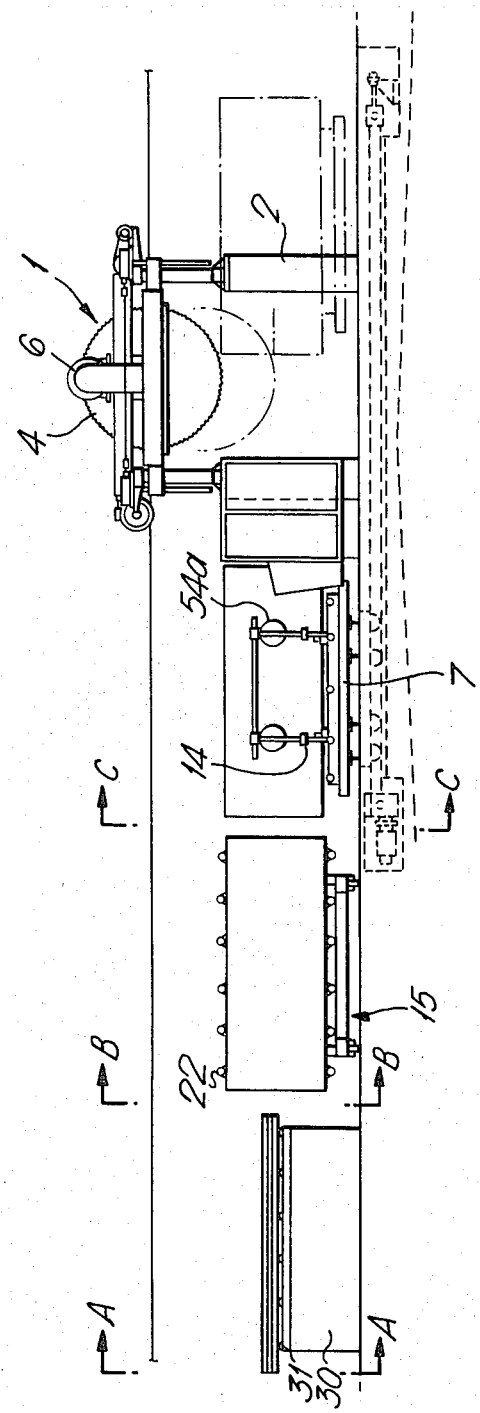
FIG. 1 is a schematic side elevation of the apparatus.

Referring to the drawings, the apparatus comprises a saw 1 mounted on a gantry 2. The saw includes two spaced-apart parallel disc blades 3, 4 which are mounted for rotation in a vertical plane. The disc blades 3, 4 are powered by electric motors 5, 6, respectively, mounted on top of the gantry 2. The blades 3, 4 are capable of being lowered downwardly of the gantry by hydraulic or electric means to the position shown by broken lines in FIG. 1. The depth of cut of each blade is slightly in excess of 600 mm.

A bogie 7 is mounted on rails 8 which extend beneath the gantry 2 and run in the same direction as the direction of cut of the saw 1. The bogie 7 is movable along the rails 8 by means of a motor and rack device which engages with the underside of the bogie. The speed of travel of the bogie is controlled to give optimum sawing conditions depending on the type of stone to be cut.

The bogie 7 carries a pair of vacuum-gripping devices 14 which are parallel to each other and spaced apart from each other a distance equal to the spacing of the blades 3, 4. One of the vaccum-gripping devices is shown in more detail in FIGS. 5 and 6 and comprises an upright frame member 51 supported on a stand 52. The frame member 51 is provided with three tubular supports 53, which are arranged vertically in the frame member and are parallel to each other. A vacuum-operated suction cup 54 is mounted on each support 53 and is movable vertically along the support. A clamp member 55 is provided on each suction cup 54 to lock the suction cup in position at a desired location on the support 53. A tilting arm 56 is pivotally connected by a pivot 57 on the stand 52 at a position opposite to, but spaced from, the frame member 51. The tilting arm 56 is provided with a clamp member 58 which serves to lock the arm in a desired position. A tubular support 59 is hingedly connected to the end of the tilting arm by means of a pivot 60. The pivot 60 is provided with a clamp member 61 by means of which the tubular support 59 can be locked relative to the arm 56. A vacuum-operated suction cup 54a is mounted on the support 59 and is movable vertically along the support. The cup 54a can be locked in position at a desired location by means of a clamp member 62. The suction cups 54 and 54a are connected by suitable tubing 63 to a vacuum pump 64.

A tumbling device 15 is positioned rearwardly of the rails 8. The tumbling device 15 is in the form of a bogie which travels on rails 16 which run transversely of the rearward end of the rails 8. As shown in FIGS. 3a, 3b and 3c the tumbling device 15 comprises a body portion 17 in which are formed two parallel channel-spaced bearings 18 and 19. The bearings 18 and 19 lie in a horizontal plane. The tumbling device 15 carries a frame 20. The frame 20 is adapted to receive and support a slab of stone with backings attached, and is provided with rollers 21 which, in the position of the frame as shown in FIG. 3a or 3c, extend vertically of the inner wall of the frame. The frame is also provided at its top and bottom edges with shorter rollers 22, the axes of rotation of which are in a plane normal to the axes of rotation of the rollers 21. Thus, when the frame is in the position shown in FIG. 3a or 3c, the rollers 22 extend horizontally of the frame. The frame 20 is provided with a pair of axles 23 and 24. When the frame is in the vertical position shown in FIG. 3a, the axle 23 engages in the channel bearing 19. However, as shown in FIG. 3b, the frame 20 can be tilted into a horizontal position in which it lies on top of the body portion 17, in which case the axle 23 remains in location within the channel bearing 19, while the axle 24 is located in the channel bearing 18. The frame 20 can then be tumbled into the vertical position shown in FIG. 3c by disengaging the axle 23 from the channel bearing 19 and pivoting the frame about the axle 24 and bearing 18.

In carrying out the method of the invention using the apparatus described above, a block of stone, which may be marble, granite or onyx for example, is cut into a number of slabs each of which has a thickness greater than twice the thickness of the desired stone lamina of the composite surface element.

Before bonding the backing sheet thereto, the stone slabs are dried, either by leaving them for a period in racks to dry naturally, or by means of force drying. When the slabs are perfectly dry the light-weight backing is attached to the opposed faces of each slab, e.g. by means of an epoxy resin. The backing preferably comprises a light-weight core material, e.g. a multicellular metal core, which has a skin of sheet material of greater tensile strength than the backing sheet bonded to at least that surface of the core remote from the surface to which the stone is attached. Preferably, however, both surfaces of the core are reinforced with a skin of sheet material. The reinforcing skins may be attached to the core before or after the sawing step but are preferably attached before. Suitably, the reinforcing skins each comprises a woven glass fibre mat which is pre-impregnated with an epoxy resin which is not fully cured. The mat is then applied to each of the opposed surfaces of the core material and is cured in position. In an alternative method, a block of stone is cut into a plurality of slabs as described above, e.g. by means of a gang saw. A plastics material such as, for example a foamed plastics material is injected into the cuts formed between the slabs. When the plastics material has hardened the slabs are separated by cutting through the hardened layer of plastics by means of a hot wire or the like to leave a layer of plastics material adhered to each opposite gace of each slab. If necessary this layer can be strengthened by the application of a reinforcing skin as described above.

A stone slab 29 with the backings attached is positioned on a conveyor 30 which includes a plurality of horizontally disposed rollers 31. The tumbling device 15 is positioned at the end of the conveyor 30 with the frame 20 disposed in the horizontal position. When in this position the rollers 21 of the frame are at the same height as the rollers 31 of the conveyor 30 and the stone slab can conveniently be rolled on to the rollers 21. When the stone slab is in position in the frame 20, the frame is tumbled into one of its vertical positions e.g. as shown in FIG. 3a. The lower longitudinal edge of the stone slab 29 then rests on the rollers 22 and is retained in the frame 20 by flanges 25.

The tumbling device 15 is then moved along the rails 16 until the stone slab 29 is aligned with rollers 28 of one of the two vacuum-gripping devices 14 on the bogie 7. The slab 29 is then rolled on to the rollers 28 of the vacuum-gripping device and is positioned on its edge in an upright position between the frame member 51 and the tilting arm 56. The tilting arm 56 and support 59 are then tilted relative to each other until the suction cup 54a is parallel to and in contact with the outer surface of the slab. The clamp members 55, 58, 61 and 62 are then locked and suction is applied to the cups 54 and 54a to hold the stone slab 29 rigidly in position. The function of the vacuum cups 54, 54a is to hold the slab rigidly during sawing without applying any substantial inwardly-directed or outwardly-directed pressure, Thus, it is important to ensure, when applying and locking the cups 54a in position against the slab, that it is not pressed too tightly inwards. This can be avoided by using the modification shown in FIG. 7. In this modification the clamp member 58 is dispensed with. Instead the tilting arm 56 is provided with a nut 66 or the like, which is welded or otherwise secured to the arm 56. The nut 66 receives, in screw engagement, a threaded rod 67 which, when the arm is positioned as shown in FIG. 7, rests against a stop 68. Thus the maximum inward tilt of the arm 56 can be predetermined by suitably adjusting the projecting length of the rod 67. The rod 67 can be secured in a desired position by means of a lock nut 69.

Figure 2:
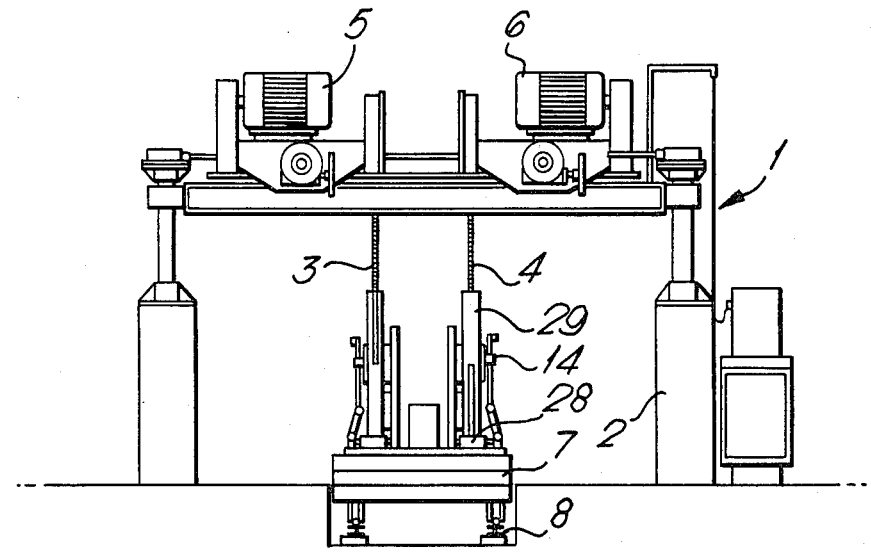
FIG. 2 is an end elevation in the direction of the arrow C of FIG. 1.
Figure 4:
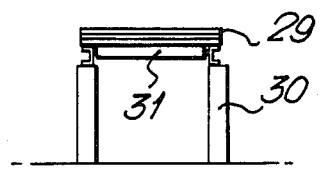
FIG. 4 is an end elevation of a conveyor shown in the direction of the arrow A of FIG. 1.

The bogie 7 is then moved beneath the saw 1 and the blade 3 is lowered to cut to the maximum depth of the blade but approximately half the depth of the slab 29 as shown to the lefthand side of FIG. 2 or, as shown in broken lines, in FIG. 1. When sawing has been completed, the slab is then rolled out of the vacuum-gripping device and into the frame 20 of the tumbling device 15. The slab is then tumbled, through 180°, over on to the opposite side of the tumbling device 15 by following the sequence shown in FIGS. 3a, 3b and 3c, and is positioned in the second vacuum-gripping device so that now the uncut longitudinal edge of the slab is facing upwardly. A second slab is positioned in the first vacuum-gripping device and the sawing procedure is repeated. The blade 4 now completes the cutting of the first slab into two separate composite surface elements while the second slab is partly cut. It will be appreciated that the side of the first slab which abutted the fixed frame when positioned in the lefthand vacuum-gripping device, as viewed in FIG. 2, abuts the fixed frame 51 of the other vacuum-gripping device when located in that device during the second cutting step. This results in the elimination of any ridge on the joint of the two cuts if there is a variation from normal of the thickness of the stone slab.

The cut sections comprising the composite stone-faced elements can then be removed directly from the side of the bogie 7 by opening the clamps and tilting back the arm 56 and support 59.

The blades 3, 4 of the saw can be either 1600 mm or 1700 mm in diameter and therefore can be thinner than the larger (i.e. 2.5 m diameter) disc saw and so leave ample thickness of stone on the cut laminae to grind and polish to give a finished lamina thickness of 3 to 4 mm from an original 20 mm thick slab.

I claim:

1. A method of manufacturing composite surface elements having a lamina of stone bonded to a backing layer comprising the steps of:
   (i) applying and bonding to each of the two opposed faces of a stone slab a backing layer comprising a core of light-weight material which is resistant to compressive forces in a direction substantially normal to the plane of the layer;
   (ii) gripping the slab, with backing layers attached, by means of a slab-gripping device;
   (iii) presenting one longitudinal edge of the slab to a disc saw and sawing the slab along a cutting plane substantially parallel to and midway between the aforesaid opposed faces of the slab to a depth which is approximately half the depth of the slab; and
   (iv) presenting the opposite longitudinal edge of the slab to a disc saw, gripping the slab as in step (ii), and sawing along the same cutting plane as in step (iii) through the remainder of the depth of the slab thereby sawing the slab in two to leave a thin stone lamina adhered to each of the backing layers.

2. A method according to claim 1, wherein after the first cut is made in the slab in step (iii) the slab is tumbled through approximately 180° to present the opposite longitudinal edge of the slab to the saw.

3. A method according to claim 1, wherein in step (ii) the slab is stood on one of its longitudinal edges between positioned vacuum-operated suction cups and suction is applied to the cups to hold the slab rigidly in position therebetween, the suction being maintained during the sawing step so as to inhibit relative movement of the partly-cut stone layers.

* * * * *